United States Patent
Liu et al.

(10) Patent No.: US 11,778,615 B2
(45) Date of Patent: Oct. 3, 2023

(54) METHOD AND DEVICE FOR TRANSMITTING SCHEDULING REQUEST

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 115 days.

(21) Appl. No.: 16/619,990

(22) PCT Filed: Jun. 6, 2018

(86) PCT No.: PCT/CN2018/090036
§ 371 (c)(1),
(2) Date: Dec. 6, 2019

(87) PCT Pub. No.: WO2018/223978
PCT Pub. Date: Dec. 13, 2018

(65) Prior Publication Data
US 2021/0100019 A1    Apr. 1, 2021

(30) Foreign Application Priority Data

Jun. 9, 2017 (WO) ................ PCT/CN2017/087752

(51) Int. Cl.
*H04W 72/12* (2009.01)
*H04W 74/08* (2009.01)
(Continued)

(52) U.S. Cl.
CPC ......... *H04W 72/21* (2023.01); *H04W 72/535* (2023.01); *H04W 74/0833* (2013.01); *H04W 76/27* (2018.02); *H04W 80/02* (2013.01)

(58) Field of Classification Search
CPC ......... H04W 72/1284; H04W 72/1257; H04W 76/27; H04W 74/0833; H04W 80/02
(Continued)

(56) References Cited

U.S. PATENT DOCUMENTS 8,243,667 B2 * 8/2012 Chun ................ H04W 74/0833
370/329
10,524,294 B2 * 12/2019 Babaei ................ H04L 5/0053
(Continued)

FOREIGN PATENT DOCUMENTS

CN    107592978 A * 1/2018 ........ H04W 72/1284
EP    2 211 585 A1    7/2010
(Continued)

OTHER PUBLICATIONS

R2-1704573 (Year: 2017).*
(Continued)

*Primary Examiner* — Intekhaab A Siddiquee
(74) *Attorney, Agent, or Firm* — Christopher & Weisberg, P.A.

(57) ABSTRACT

A method and device for transmitting a scheduling request, the method includes: transmitting a scheduling request to a network device via a random access procedure when a maximum counter value of a scheduling request configuration is reached; information on the scheduling request configuration is transmitted to the network device during the random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

20 Claims, 7 Drawing Sheets

(51) Int. Cl.
*H04W 76/27* (2018.01)
*H04W 80/02* (2009.01)
*H04W 72/50* (2023.01)
*H04W 72/21* (2023.01)

(58) Field of Classification Search
USPC .................................................. 370/329
See application file for complete search history.

(56) References Cited

U.S. PATENT DOCUMENTS

| | | | |
|---|---|---|---|
| 10,701,733 B2 | 6/2020 | You et al. | |
| 2016/0295607 A1* | 10/2016 | Vajapeyam | ........... H04W 24/08 |
| 2016/0309503 A1 | 10/2016 | Quan et al. | |

FOREIGN PATENT DOCUMENTS

| | | | | |
|---|---|---|---|---|
| EP | 3637828 A1 * | 4/2020 | ........... | H04L 1/1642 |
| EP | 3 668 238 A1 | 6/2020 | | |
| WO | WO-2013166669 A1 * | 11/2013 | ........... | H04L 1/1854 |
| WO | 2015/100680 A1 | 7/2015 | | |
| WO | 2016/046606 A1 | 3/2016 | | |
| WO | 2017/128104 A1 | 8/2017 | | |

OTHER PUBLICATIONS

R2-1701207 (Year: 2017).*
62514292 P (Year: 2017).*
62501570 P (Year: 2017).*
R2-1704589, "Enhanced SR in NR", 3GPP TSG-RAN WG2 Meeting #98, Hangzhou, China, May 15-19, 2017, source vivo (Year: 2017).*
Renesas Mobile Europe Ltd, "Discussion on the UL blocking due to ACK-NACK repetition", 3GPP TSG-RAN WG1 Meeting #70; R1-123710; Qingdao, China, Aug. 13-17, 2012 (4 pages).
International Search Report and Written Opinion dated Aug. 14, 2018 issued in International Patent Application No. PCT/CN2018/090036. (7 pages).
Huawei et al., "SR triggering and cancellation", 3GPP TSG-RAN WG2 #98, R2-1705198, Hangzhou, China, May 15-19, 2017 (3 pages).
Mediatek Inc., "SR/BSR design for multiple numerology" 3GPP TSG-RAN WG2 #98, R2-1704946, Hangzhou, China, May 15-19, 2017 (3 pages).
Huawei et al., "Further discussion on differentiation for SR-triggered Random Access", 3GPP TSG-RAN WG2 NR #99bis, R2-1711428, Prague, Czech Republic, Oct. 9-13, 2017 (2 pages).
Huawei et al., "Differentiation for SR-triggered Random Access", 3GPP TSG-RAN WG2 NR #99, R2-1708966, Berlin, Germay, Aug. 21-25, 2017 (2 pages).
EPO Communication dated Sep. 28, 2022 for Patent Application No. 18814301.0, consisting of 8-pages.
3GPP TSG-RAN WG2 Meeting #98 R2-1704589; Title: Enhanced SR in NR; Agenda Item: 10.3.1.5; Source: Vivo; Document for: Discussion and Decision; Date and Location: May 15-19, 2017, Hangzhou, China, consisting of 3-pages.

* cited by examiner

METHOD AND DEVICE FOR TRANSMITTING SCHEDULING REQUEST

CROSS REFERENCE TO RELATED APPLICATION(S)

This application is a 35 U.S.C. § 371 National Stage of International Patent Application No. PCT/CN2018/090036, filed Jun. 6, 2018, designating the United States and claiming priority to International Patent Application No. PCT/CN2017/087752, filed on Jun. 9, 2017. The above identified applications are incorporated by reference.

TECHNICAL FIELD

Embodiments of the present disclosure generally relate to the field of communications, and more particularly, to a method and device for transmitting a scheduling request (SR).

BACKGROUND

This section introduces aspects that may facilitate better understanding of the present disclosure. Accordingly, the statements of this section are to be read in this light and are not to be understood as admissions about what is in the prior art or what is not in the prior art.

In a long term evolution (LTE) system, TS 36.321 specifies a framework for buffer status reporting (BSR). Buffer status reporting is used by a user equipment (UE) to report to a base station (such as an eNB) the amount of data stored in its buffers for transmission. The base station uses these reports to allocate resources to the UE, and to prioritize resource allocation between different UEs.

The UE may trigger a regular BSR when uplink data becomes available for transmission and this data belongs to a logical channel group (LCG) or a radio bearer group with higher priority than those for which data already existed in the buffer, or when buffers of the UE were empty just before this new data became available for transmission. If no uplink grant is available, an SR transmission will be triggered.

An SR is either sent via a random access channel (RACH) procedure (this SR may be referred to as an RA-SR) or on a dedicated resource of physical uplink control channel (PUCCH) (this SR may be referred to as a D-SR). The D-SR is typically used when radio uplink of the UE is time synchronized. The purpose is to enable UE to rapidly request resources for uplink data transmission.

In $3^{rd}$ generation partner project (3GPP), a dedicated solution for the SR has been agreed. For the dedicated approach, each active UE is assigned a dedicated channel for SR The benefit with this method is that no UE identity (ID) need to be transmitted explicitly, since the UE is identified by the channel used. Furthermore, intra-cell collisions may not occur in contrast to a contention based approach.

SUMMARY

However, in the current 3GPP standardization for the fifth generation (5G), such as new radio (NR), it has been agreed to support multiple SR configurations for a terminal device (such as a UE) to distinguish different logical channels (LCHs)/logical channel groups (LCGs). This is different from LTE, where a terminal device only supports one SR configuration.

Since there are multiple active SR configurations available for the terminal device in NR, a network device does not know which SR configuration that the terminal device would like to reconfigure upon reception of one or more RACH messages. It is not always feasible if the network device releases all SR resources and re-assigns new resources for the terminal device because the resources of different SR configurations are different. That would bring unnecessary service interruption for other LCGs/LCHs. Therefore, it is necessary to enhance RA-SR mechanism for NR.

In order to solve at least part of the above problems, methods, apparatus, devices and computer programs are provided in the present disclosure. It may be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for transmitting a scheduling request. Information on a scheduling request configuration is transmitted by a terminal device to a network device during random access procedure.

In a first aspect, there is provided a method in a terminal device for transmitting a scheduling request, the method includes: transmitting a scheduling request to a network device via a random access procedure when a maximum counter value of a scheduling request configuration is reached. Information on the scheduling request configuration is transmitted to the network device during the random access procedure.

In one embodiment, a preamble of the random access procedure is transmitted to the network device; one or more resources for transmitting the preamble is/are corresponding to the scheduling request configuration.

In one embodiment, the resources for transmitting the preamble includes one or more of the following: sequence resources, frequency resources and time resources.

In one embodiment, a message of the random access procedure is transmitted to the network device; an identity of the terminal device and the information on the scheduling request configuration are included in the message.

In one embodiment, the information on one or more scheduling request configurations are included in the message when the maximum counter values of the one or more scheduling request configurations are reached.

In one embodiment, the message is Message 3 of the random access procedure; and the information on scheduling request configuration is included in a medium access control (MAC) control element (CE) in the Message 3.

In one embodiment, one or more of the following information is included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

In one embodiment, the method further includes: receiving a radio resource control reconfiguration signaling to reconfigure the scheduling request configuration. The information on the scheduling request configuration is included in the radio resource control reconfiguration signaling.

In one embodiment, the method further includes: releasing resources of all scheduling request configurations when a maximum counter value of a scheduling request configuration is reached; or releasing resources of a scheduling request configuration when a maximum counter value of the corresponding scheduling request configuration is reached; or releasing resources of a group of scheduling request configurations when a maximum counter value of the scheduling request configuration is reached.

In one embodiment, information on releasing resources of one or more scheduling request configurations is predefined, or is preconfigured by a radio resource control signaling.

In one embodiment, the method further includes: receiving information on releasing resources of one or more scheduling request configurations via a radio resource control signaling.

In a second aspect, there is provided a method in a network device for receiving a scheduling request, the method includes: receiving a scheduling request from a terminal device via a random access procedure. The scheduling request is triggered in the terminal device when a maximum counter value of a scheduling request configuration is reached and information on the scheduling request configuration is transmitted to the network device during the random access procedure.

In one embodiment, a preamble of the random access procedure is received from the terminal device; one or more resources for transmitting the preamble is/are corresponding to the scheduling request configuration.

In one embodiment, the resources for transmitting the preamble include one or more of the following: sequence resources, frequency resources and time resources.

In one embodiment, a message of the random access procedure is received from the terminal device; an identity of the terminal device and the information on the scheduling request configuration are included in the message.

In one embodiment, the information on one or more scheduling request configurations is included in the message when the maximum counter values of the one or more scheduling request configurations are reached.

In one embodiment, the message is Message 3 of the random access procedure; and the information on scheduling request configuration is included in a medium access control (MAC) control element (CE) in the Message 3.

In one embodiment, one or more of the following information is included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

In one embodiment, the method further includes: transmitting a radio resource control reconfiguration signaling to reconfigure the scheduling request configuration; the information on the scheduling request configuration is included in the radio resource control reconfiguration signaling.

In one embodiment, the method further includes: transmitting information on releasing resources of one or more scheduling request configurations via a radio resource control signaling.

In a third aspect, there is provide a terminal device, including a processor and a memory, wherein the memory containing instructions executable by the processor whereby the terminal device is operative to perform a method for transmitting a scheduling request according to the first aspect.

In a fourth aspect, there is provide a network device, including a processor and a memory, wherein the memory containing instructions executable by the processor whereby the network device is operative to perform a method for receiving a scheduling request according to the second aspect.

In a fifth aspect, there is provide a communications system, including: a terminal device configured to perform a method for transmitting a scheduling request according to the first aspect; and a network device configured to perform a method for transmitting a scheduling request according to the second aspect.

According to various embodiments of the present disclosure, information on SR configuration is transmitted by a terminal device to a network device during random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
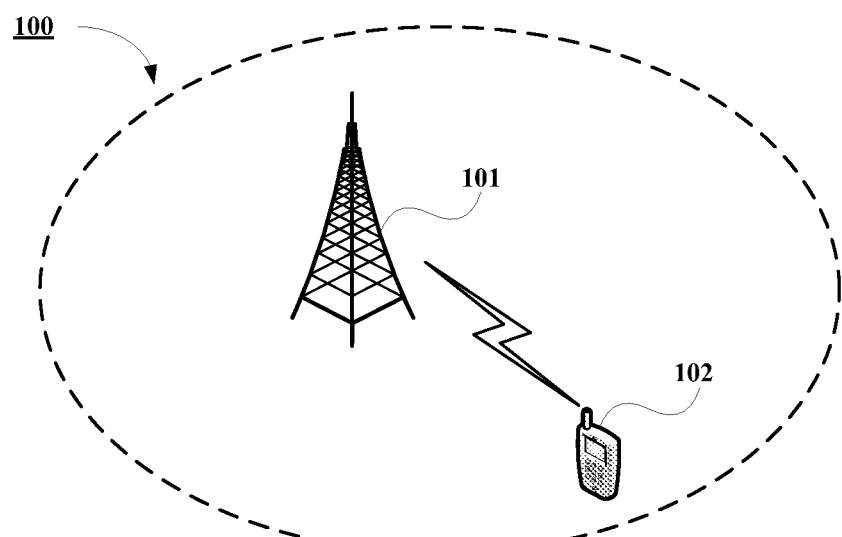
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

FIG. 1 shows a schematic diagram of a wireless communication network 100 in which embodiments of the disclosure may be implemented. As shown in FIG. 1, the wireless communication network 100 may include one or more network devices, for example network devices 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102" within its coverage, where N is a natural number.

The network device 101 includes processing circuitry, device readable medium, interface, user interface equipment, auxiliary equipment, power source, power delivery circuitry, and antenna. These components are depicted as single boxes located within a single larger box, and in some cases, contain additional boxes therein.

In practice however, the network device 101 may include multiple different physical components that make up a single illustrated component (e.g., interface includes ports/terminals for coupling wires for a wired connection and radio front end circuitry for a wireless connection). As another example, network device 101 may be a virtual network node. Similarly, network node may be composed of multiple physically separate components (e.g., a NodeB component and a RNC component, a BTS component and a BSC component, etc.), which may each have their own respective components.

In certain scenarios in which network device includes multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

Although network device 101 illustrated in the example wireless communication network may represent a device that includes a particular combination of hardware components, other embodiments may include network nodes with different combinations of components. It is to be understood that a network device may include any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

The scheduling request (SR) is used for requesting uplink shared channel (UL-SCH) resources for new transmission. When an SR is triggered, it shall be considered as pending until it is cancelled. All pending SRs shall be cancelled and sr-ProhibitTimer shall be stopped when a medium access control (MAC) protocol data unit (PDU) is assembled and this PDU includes a BSR which contains buffer status up to (and including) the last event that triggered the BSR, or when the UL grant(s) can accommodate all pending data available for transmission.

If an SR is triggered and there is no other SR pending, an MAC entity shall set SR_COUNTER to 0. As long as one SR is pending, the MAC entity shall execute the following operations in Table 1 for each transmission time interval (TTI), for example:

TABLE 1

- if no UL-SCH resources are available for a transmission in this TTI:
    - if the MAC entity has no valid PUCCH resource for SR configured in any TTI and if rach-Skip for an MCG MAC entity or rach-SkipSCG for an SCG MAC entity is not configured: initiate a random access procedure on a SpCell and cancel all pending SRs;
    - if SR_COUNTER < dsr-TransMax:
        - increment SR_COUNTER by 1;
        - instruct a physical layer to signal the SR on one valid PUCCH resource for SR;
        - start the sr-ProhibitTimer.
    - else:
        - notify RRC to release PUCCH for all serving cells;
        - notify RRC to release SRS for all serving cells;

TABLE 1-continued

- clear any configured downlink assignments and uplink grants;
- initiate a random access procedure on the SpCell and cancel all pending SRs.

As a summary, the D-SR is repeatedly transmitted on consecutive SR opportunities on PUCCH until the terminal device receives an UL grant on a physical downlink control channel (PDCCH). The transmission is stopped at least when PUCCH resources are released and/or UL synchronization is lost even if the terminal device has not received any UL grant on the PDCCH.

Figure 2:
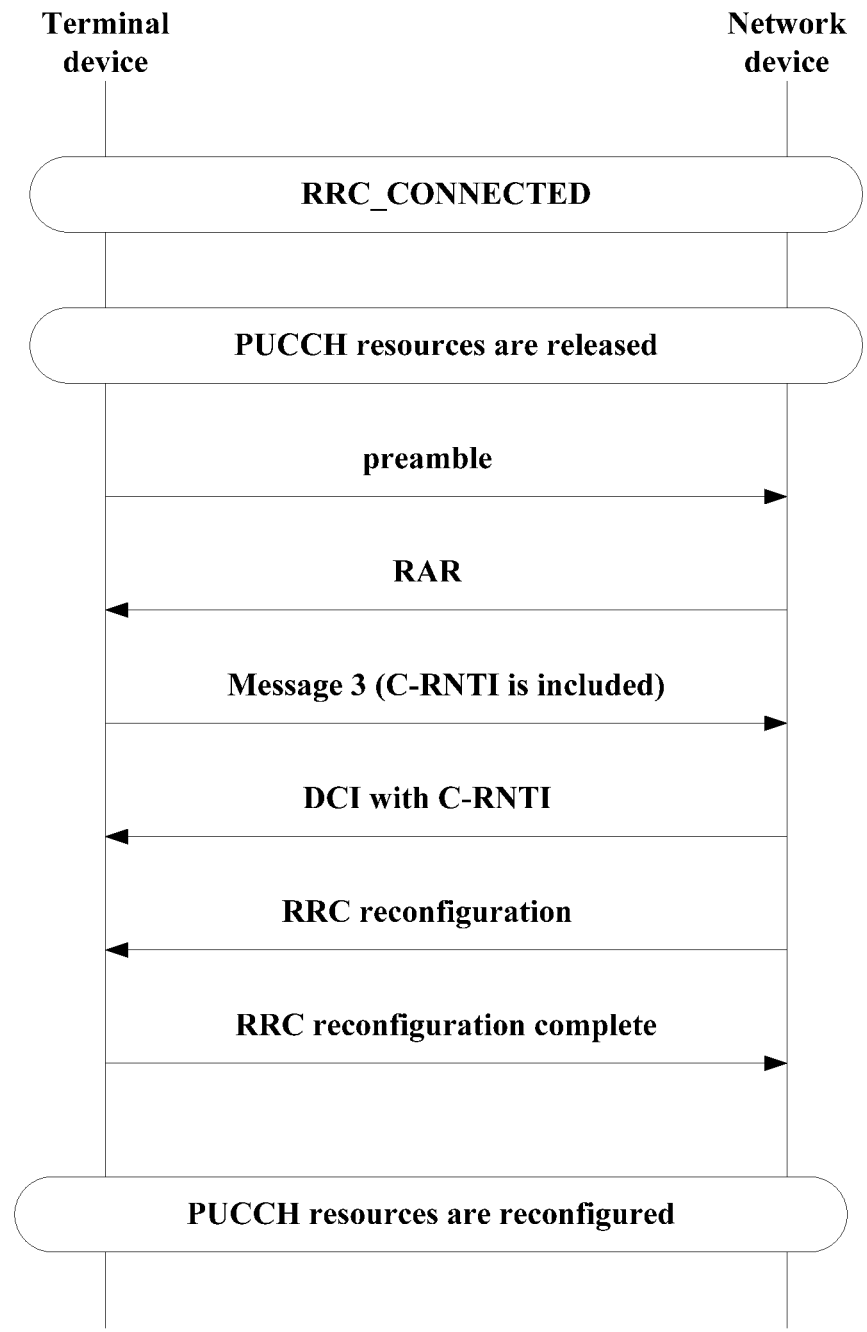
FIG. 2 is a diagram which illustrates an RRC signaling procedure for reconfiguration of PUCCH resources.

FIG. 2 is a diagram which illustrates an RRC signaling procedure for reconfiguration of the PUCCH resources. As shown in FIG. 2, after stopping transmission on the D-SR, a terminal device transmits an RA-SR (i.e. accesses the system via RACH). In this case, the terminal device already has a valid cell radio network temporary identifier (C-RNTI), and the C-RNTI would be included in Message 3 for contention resolution purpose. Upon reception of the Message 3, a network device then assigns dedicated SR resource/configuration for the terminal device via an RRC signaling message without reestablishment of the RRC connection.

In LTE, each SR configuration may carry the following information, for example:

TABLE 2

```
SchedulingRequestConfig ::= CHOICE {
    release NULL,
    setup SEQUENCE {
        sr-PUCCH-ResourceIndex INTEGER (0..2047),
        sr-ConfigIndex INTEGER (0..157),
        dsr-TransMax ENUMERATED {
            n4, n8, n16, n32, n64, spare3, spare2, spare1}
    }
}
```

Where each SR configuration may contain sr-PUCCH-ResourceIndex, sr-ConfigIndex and dsr-TransMax. The sr-PUCCH-ResourceIndex identifies the PUCCH resource location; the sr-ConfigIndex is used to determine the subframe where SR shall be transmitted based on following Table 3 and formula; the dsr-TransMax is a maximum number of SR transmission count.

TABLE 3

UE-specific SR periodicity and subframe offset configuration

| SR configuration Index $I_{SR}$ | SR periodicity (ms) $SR_{PERIODICITY}$ | SR subframe offset $N_{OFFSET, SR}$ |
| --- | --- | --- |
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

The terminal device can transmit SR at the subframe where following condition is met, for example, $(10 \times n_f + \lfloor n_s/2 \rfloor) - N_{OFFSET,SR}) \mod SR_{PERIODICITY} = 0$.

On the other hand, data may be mapped to logical channels in Layer 2 and each logical channel has been assigned a priority (i.e. logical channel priority, LCP). an MAC scheduler then schedules the transmissions for the logical channels according to a descending order of LCPs for the logical channels.

To optimize user experience, it was agreed that a logical channel can be further configured with preferred numerology/slot duration (or TTI length) to fulfil differentiated delay requirements. There are some agreements concerning SR configurations.

For example, multiple SR configurations can be configured to the terminal device and which SR configuration is used depends on the LCH that triggers the SR. For another example, a single bit SR with multiple SR configuration is sufficient to indicate the "numerology/TTI length" of the logical channel that trigger the SR.

According to the above agreements, a terminal device in NR may be configured with multiple SR configurations with correspondence to LCGs, in order to indicate "numerology/TTI length" of the logical channel that trigger the SR. Each SR configuration may be corresponding to one LCG/LCH.

When a terminal device has multiple logical channels of different priorities, each logical channel may be configured/mapped with different TTI lengths/numerology characteristics (e.g., subcarrier spacing, SCS). To avoid transmitting data belonging to a LCH with higher priority/low latency requirement on a TTI length/numerology leading to a long delay, the terminal device need to send a SR indicating exactly which logical channel is requesting resources. However, in the current LTE SR format, a SR only carries 1 bit, which is not sufficient to differentiate the LCHs.

Furthermore, for a certain SR configuration, if a terminal device in NR has transmitted SR for maximum amount times (dsr-TransMax configured for that SR configuration) without getting resource assignments from the network device, according to the existing LTE specification, the terminal device will release the resources associated with this SR configuration, and initiate an RACH procedure to request dedicated SR resource. Since there are multiple active SR configurations available for the terminal device, the network device does not know which SR configuration that the terminal device would like to reconfigure upon reception of the RACH messages. It is not always feasible for other LCGs/LCHs, if the network device releases all SR resources and re-assigns new resources for the terminal device because the resources of different SR configurations are different. That would bring unnecessary service interruption for other LCGs/LCHs.

Therefore, it is necessary to improve RA-SR mechanism for NR, for example, focusing on how to identify the LCG/LCH whose SR_COUNTER reaches dsr-TransMax.

First Aspect of Embodiments

A method for transmitting a scheduling request is provided in an embodiment. The method is implemented at a terminal device as an example.

Figure 3:
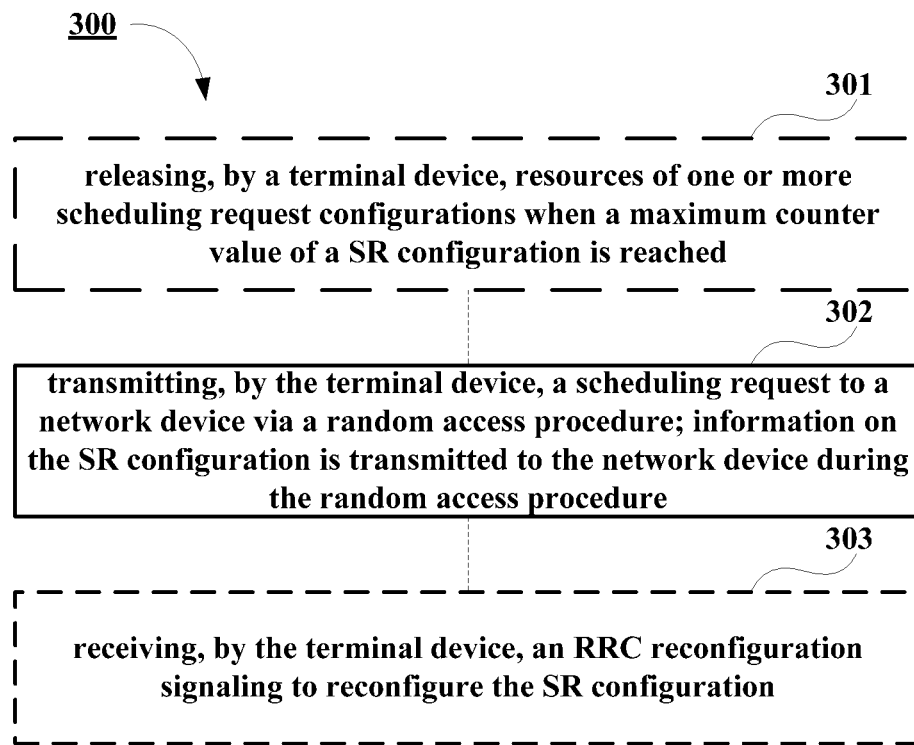
FIG. 3 is a flowchart which shows a method 300 for transmitting a scheduling request in accordance with an embodiment of the present disclosure.

FIG. 3 is a flowchart which shows a method 300 for transmitting a scheduling request in accordance with an embodiment of the present disclosure, and illustrates the method for transmitting a scheduling request by taking a terminal device as an example.

As shown in FIG. 3, the method 300 includes transmitting, by a terminal device, a scheduling request to a network device via (or by using, or by initiating) a random access procedure when a maximum counter value of a scheduling request configuration is reached, at block 302. In this disclosure, information on the scheduling request configuration is transmitted to the network device during the random access procedure.

In an embodiment, as shown in FIG. 3, the method 300 may further include receiving, by the terminal device, a radio resource control (RRC) reconfiguration signaling to reconfigure the scheduling request configuration, at block 303. The information on the scheduling request configuration is included in the RRC reconfiguration signaling.

In an embodiment, the information on the scheduling request configuration is transmitted to the network device during the random access procedure (or may be referred to as RACH procedure, for example a PRACH is used). Therefore, additional information on which a certain SR resource/SR configuration is provided, when an MAC entity of the terminal device has reached its maximum SR transmission times for the certain SR configuration, such as SR_COUNTER of the certain SR configuration reaches dsr-TransMax. The network device reconfigures resources of the SR configuration for the terminal device.

In an embodiment, as shown in FIG. 3, the method 300 may further include releasing, by the terminal device, resources of one or more scheduling request configurations when a maximum counter value of a scheduling request configuration is reached, at block 301.

It should be appreciated that FIG. 3 is only an example of the disclosure, but it is not limited thereto. For example, the order of operations at blocks may be adjusted and/or some blocks may be omitted. Moreover, some blocks not shown in FIG. 3 may be added.

In this embodiment, resources of all scheduling request configurations may be released, or resources of the corresponding scheduling request configuration may be released, or resources of a group of scheduling request configurations may be released; when a maximum counter value of a scheduling request configuration is reached.

For example, when there are multiple SR configurations for a terminal device, any SR configuration can reach the maximum SR transmission attempts. The terminal device may release all SR resources if there is a certain SR configuration whose SR_COUNTER reaches dsr-TransMax. The network device may reconfigure resources of all SR configurations.

For another example, the terminal device may release a part of SR resources if there is a certain SR configuration whose SR_COUNTER reaches dsr-TransMax, such as the resources of other SR configurations with a lower priority level or lower quality (such as SINR, SNR, received power target) than the certain SR configuration. That is, this certain SR configuration is used for a LCG/LCHs, with a higher priority level than other LCGs/LCHs using the other SR configurations. The network device may reconfigure resources of the other SR configurations.

For another example, the terminal device may only release resources of the corresponding SR configuration if there is a certain SR configuration whose SR_COUNTER reaches dsr-TransMax. The network device may reconfigure resources of the corresponding SR configuration.

In an embodiment, rules that how to release the resources of one or more SR configurations, may be predefined, or preconfigured by an RRC signaling. However, it is not limited in this disclosure.

For example, information on releasing resources of one or more scheduling request configurations may be predefined in specification. For another example, the network device may transmit information on releasing resources of one or more scheduling request configurations via a radio resource control (RRC) signaling; and the terminal device may pre-configure the rules for releasing SR resources according to the RRC signaling.

After releasing the resources of the SR configurations, the terminal device may start the RACH procedure to request the network device to reconfigure the corresponding resources of the SR configurations. The signaling procedure will be illustrated in FIG. 4 and FIG. 5 as examples.

In an embodiment, Message 1 of the random access procedure may be extended to identify the SR configuration. For example, one or more resources for transmitting a preamble is/are corresponding to the SR configuration.

Figure 4:
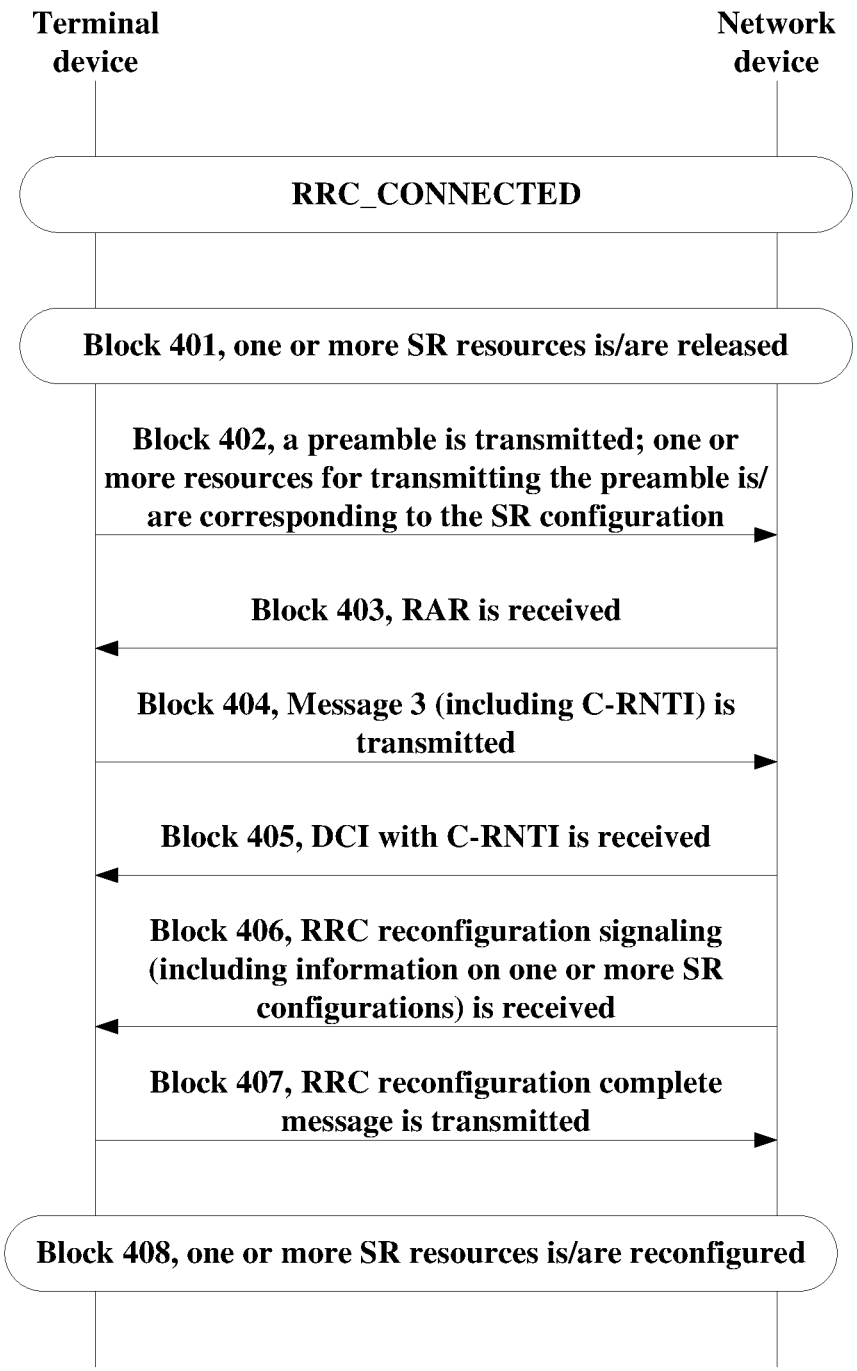
FIG. 4 is a diagram which illustrates an RRC signaling procedure for reconfiguration of SR resources in accordance with an embodiment of the present disclosure.

FIG. 4 is a diagram which illustrates an RRC signaling procedure for reconfiguration of SR resources in accordance with an embodiment of the present disclosure.

As shown in FIG. 4, the method 400 may include releasing, by a terminal device, resources of one or more scheduling request configurations when a maximum counter value of the scheduling request configuration is reached, at block 401.

As shown in FIG. 4, the method 400 further includes transmitting, by the terminal device, a preamble to the network device, at block 402. One or more resources for transmitting the preamble is/are corresponding to the scheduling request configuration.

In this embodiment, the resources for transmitting the preamble may be one or more of the following: sequence resources, frequency resources and time resources. However, it is not limited in this disclosure.

For example, the network device may assign/preconfigure multiple RACH resources/configurations for the terminal device configured with multiple SR configurations. Each RACH resource/configuration may be mapped to each SR configuration.

In a simple example, the terminal device may use the RACH resource with the same index as the SR configuration that triggers the RACH procedure, i.e, its SR_COUNTER reaches dsr-TransMax. The terminal device may use the RACH resource/configuration to transmit an RA-SR associated with the SR configuration whose SR_COUNTER reaches dsr-TransMax. The RACH resources can be defined as PRACH preamble sequence, or other PRACH resources (such as in frequency and/or time domain).

As shown in FIG. 4, the method 400 may further include receiving, by the terminal device, a random access response (RAR) from the network device, at block 403; transmitting, by the terminal device, Message 3 including a C-RNTI to the network device, at block 404; and receiving downlink control information (DCI) with the C-RNTI from the network device, at block 405.

As shown in FIG. 4, the method 400 may further include receiving, by the terminal device, an RRC reconfiguration signaling including information on one or more SR configurations (such as one or more indices of the SR configurations) from the network device, at block 406; transmitting, by the terminal device, an RRC reconfiguration complete message to the network device, at block 407; and resources of one or more SR configurations are reconfigured, at block 408.

In this embodiment, Message 1 of the random access procedure is used to inform the network device that the related SR configuration need to be reconfigured. For example, the relationship between the SR configuration and the resources transmitting the preamble may be predefined or preconfigured.

In another embodiment, Message 3 of the random access procedure may be extended to identify the SR configuration. For example, an identity of the terminal device and the information on the scheduling request configuration are included in the Message 3.

Figure 5:
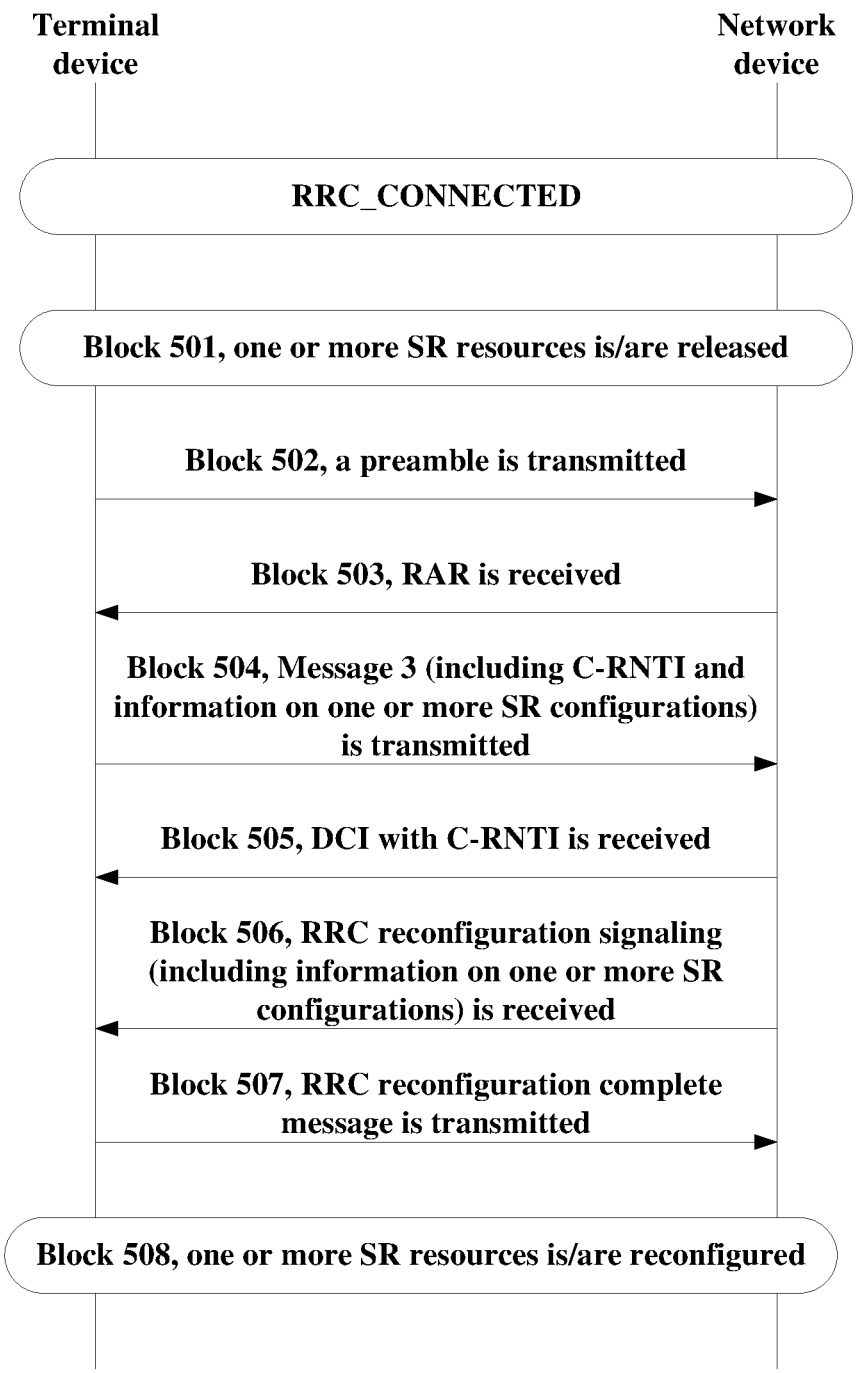
FIG. 5 is another diagram which illustrates an RRC signaling procedure for reconfiguration of SR resources in accordance with an embodiment of the present disclosure.

FIG. 5 is another diagram which illustrates an RRC signaling procedure for reconfiguration of SR resources in accordance with an embodiment of the present disclosure.

As shown in FIG. 5, the method 500 may include releasing, by a terminal device, resources of one or more scheduling request configurations when a maximum counter value of the scheduling request configuration is reached, at block 501.

As shown in FIG. 5, the method 500 may further include transmitting, by the terminal device, a preamble to the network device, at block 502; and receiving, by the terminal device, a random access response (RAR) from the network device, at block 503.

As shown in FIG. 5, the method 500 further includes transmitting, by the terminal device, Message 3 to the network device, at block 504; the Message includes a C-RNTI and information on one or more scheduling request configurations.

In this embodiment, in Message 3, the MAC entity of the terminal device may include its C-RNTI in MAC CE (it may be referred to as C-RNTI MAC CE), together with the index of the SR configuration that its SR_COUNTER reaches dsr-TransMax. The network device determines which SR configuration needs to be reconfigured upon reception of the Message 3.

In this embodiment, the MAC entity of the terminal device may include more than one indices of the associated SR configurations in Message 3, if there are more than one SR configurations that trigger the RACH, i.e., their SR_COUNTER reach dsr-TransMax. Grouping several SR configurations together, by sending one RACH procedure, would be beneficial to reduce the RACH load, especially when there are a lot of terminal devices that are configured with multiple SR configurations.

As an example, the MAC entity of the terminal device may include a bitmap of indices of the SR configurations in order to save space in the MAC header in Message 3.

As another example, the MAC entity of the terminal device may include one or more than one IDs of LCGs whose associated SR configurations have triggered the RACH procedure in Message 3.

As another example, the MAC entity of the terminal device may include one or more than one IDs of LCHs whose associated SR configurations have triggered the RACH procedure in Message 3.

As another example, the MAC entity of the terminal device may include a bitmap of the IDs of LCGs/LCHs that have triggered the RACH procedure in Message 3.

As another example, the MAC entity of the terminal device may include a relative index/ID instead of the absolute index/ID of the SR configurations/LCGs/LCHs in Message 3.

As another example, the MAC entity of the terminal device may indicate all SR configurations/SR resources to be reconfigured, by not including any IDs/indicies of SR configurations/SR resources not to be reconfigured.

For examples that are described above, anew MAC CE may be defined to carry the ID/index or bitmap which are associated with the SR configurations/LCGs/LCHs. Another option is to extend the C-RNTI MAC CE to carry the ID/index or bitmap. Yet another option is to reuse fileIds in existing MAC CEs to carry the ID/index or bitmap. However, it is not limited thereto in this disclosure.

As shown in FIG. 5, the method 500 may further include receiving, by the terminal device, downlink control information (DCI) with the C-RNTI from the network device, at block 505.

As shown in FIG. 5, the method 500 may further include receiving, by the terminal device, an RRC reconfiguration signaling included information on one or more SR configurations (such as one or more indices of the SR configurations) from the network device, at block 506; transmitting, by the terminal device, an RRC reconfiguration complete message to the network device, at block 507; and resources of one or more SR configurations are reconfigured, at block 508.

In this embodiment, the terminal device may carry information on SR configuration (such as index of SR configuration) in Message 3 to inform the network device that the related SR configuration need to be reconfigured. Upon reception of Message 3, the network device performs the reconfiguration for the related SR configuration.

It should be appreciated that FIGS. 4 and 5 are only examples of the disclosure, but it is not limited thereto. For example, the order of operations at blocks may be adjusted and/or some blocks may be omitted. Moreover, some blocks not shown in FIGS. 4 and 5 may be added.

In addition, 4-blocks random access procedure is illustrated as examples in FIG. 4 and FIG. 5; but it is not limited thereto in this disclosure. For example, 2-blocks random access procedure or other random access procedures may be adopted according to actual scenarios.

As can be seen from the above embodiments, information on SR configuration is transmitted by a terminal device to a network device during random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

Second Aspect of Embodiments

A method for receiving a scheduling request is provided in an embodiment. The method is implemented at a network device as an example, and the same contents as those in the first aspect of embodiments are omitted.

Figure 6:
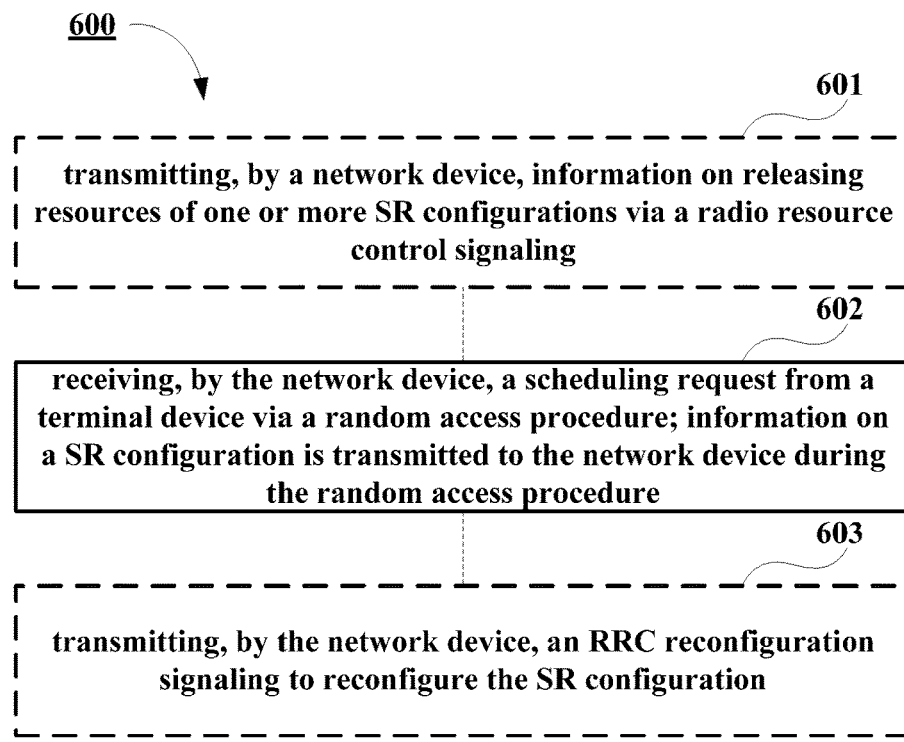
FIG. 6 is a flowchart which shows a method 600 for receiving a scheduling request in accordance with an embodiment of the present disclosure.

FIG. 6 is a flowchart which shows a method 600 for receiving a scheduling request in accordance with an embodiment of the present disclosure, and illustrates the method for receiving a scheduling request by taking a network device as an example.

As shown in FIG. 6, the method 600 includes receiving, by a network device, a scheduling request from a terminal device via a random access procedure, at block 602. The scheduling request is triggered in the terminal device when a maximum counter value of a scheduling request configuration is reached and information on the scheduling request configuration is transmitted to the network device during the random access procedure.

As shown in FIG. 6, the method 600 may further include transmitting, by the network device, a radio resource control reconfiguration signaling to reconfigure the scheduling request configuration, at block 603. The information on the scheduling request configuration is included in the radio resource control reconfiguration signaling.

As shown in FIG. 6, the method 600 may further include transmitting, by the network device, information on releasing resources of one or more scheduling request configurations via a radio resource control signaling, at block 601. Therefore, the terminal device may preconfigure the rules for releasing SR resources according to the RRC signaling.

In an embodiment, Message 1 of the random access procedure may be extended to identify the SR configuration. For example, one or more resources for transmitting a preamble is/are corresponding to the SR configuration.

In this embodiment, the resources for transmitting the preamble may include one or more of the following: sequence resources, frequency resources and time resources.

In another embodiment, Message 3 of the random access procedure may be extended to identify the SR configuration. For example, an identity of the terminal device and the information on the scheduling request configuration are included in the Message 3.

In this embodiment, the information on one or more scheduling request configurations may be included in the message when the maximum counter values of the one or more scheduling request configurations are reached. The information on scheduling request configuration may be included in a medium access control (MAC) control element (CE) of the Message 3.

For example, one or more of the following information may be included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

As can be seen from the above embodiments, information on SR configuration is transmitted by a terminal device to a network device during random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

Third Aspect of Embodiments

An apparatus for transmitting a scheduling request is provided in an embodiment. The apparatus may be configured in the terminal device 102, and the same contents as those in the first aspect of embodiments are omitted.

Figure 7:
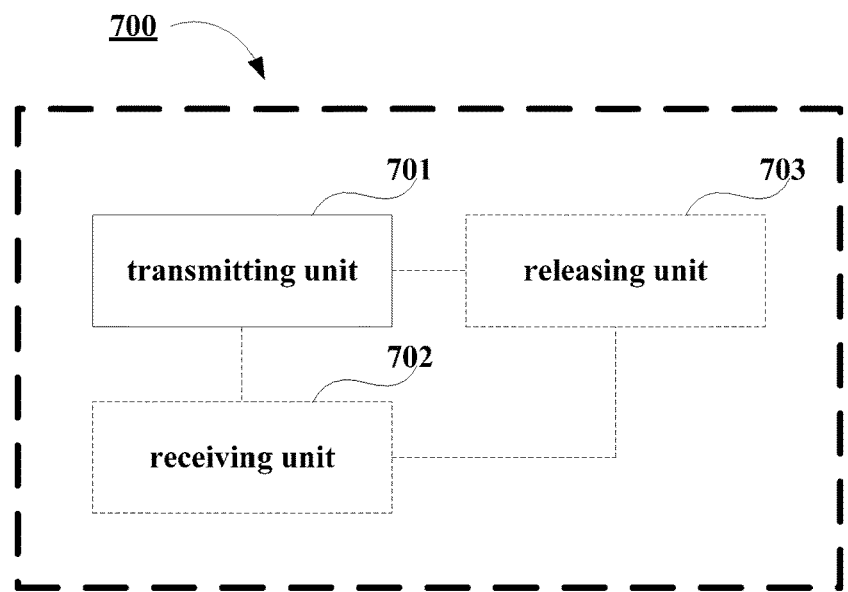
FIG. 7 shows a block diagram of an apparatus 700 for transmitting a scheduling request in accordance with an embodiment of the present disclosure.

FIG. 7 shows a block diagram of an apparatus 700 for transmitting a scheduling request in accordance with an embodiment of the present disclosure.

As shown in FIG. 7, the apparatus 700 includes: a transmitting unit 701 configured to transmit a scheduling request to a network device via a random access procedure when a maximum counter value of a scheduling request configuration is reached; information on the scheduling request configuration is transmitted to the network device during the random access procedure.

As shown in FIG. 7, the apparatus 700 may further include: a receiving unit 702 configured to receive a radio resource control reconfiguration signaling to reconfigure the scheduling request configuration; the information on the scheduling request configuration is included in the radio resource control reconfiguration signaling.

As shown in FIG. 7, the apparatus 700 may further include: a releasing unit 703 configured to release resources of all scheduling request configurations when a maximum counter value of a scheduling request configuration is reached; or release resources of a scheduling request configuration when a maximum counter value of the corresponding scheduling request configuration is reached; or release resources of a group of scheduling request configurations when a maximum counter value of the scheduling request configuration is reached.

In an embodiment, information on releasing resources of one or more scheduling request configurations is predefined, or is preconfigured by a radio resource control signaling.

In an embodiment, the receiving unit 702 may further configured to receive information on releasing resources of one or more scheduling request configurations via a radio resource control (RRC) signaling. Rules for releasing SR resources may be preconfigured according to the RRC signaling.

In an embodiment, a preamble of the random access procedure may be transmitted by the terminal device to the network device; one or more resources for transmitting the preamble is/are corresponding to the scheduling request configuration.

In this embodiment, the resources for transmitting the preamble may include one or more of the following: sequence resources, frequency resources and time resources.

In another embodiment, a message of the random access procedure may be transmitted by the terminal device to the network device; an identity of the terminal device and the information on the scheduling request configuration are included in the message.

In this embodiment, the information on one or more scheduling request configurations may be included in the message when the maximum counter values of the one or more scheduling request configurations are reached.

In this embodiment, the message may be Message 3 of the random access procedure; and the information on scheduling request configuration may be included in a medium access control (MAC) control element (CE) of the Message 3.

In this embodiment, one or more of the following information may be included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

It should be appreciated that components included in the apparatus 700 correspond to the operations of the method 300. Therefore, all operations and features described above with reference to FIG. 3 are likewise applicable to the components included in the apparatus 700 and have similar effects. For the purpose of simplification, the details will be omitted.

It should be appreciated that the components included in the apparatus 700 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 700 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 700 may be a part of a device. But it is not limited thereto, for example, the apparatus 700 may be the terminal device 102, other parts of the terminal device 102, such as transmitter and receiver, are omitted in the FIG. 7.

As can be seen from the above embodiments, information on SR configuration is transmitted by a terminal device to a network device during random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

Fourth Aspect of Embodiments

An apparatus for receiving a scheduling request is provided in an embodiment. The apparatus may be configured in the network device 101, and the same contents as those in the first or second aspect of embodiments are omitted.

Figure 8:
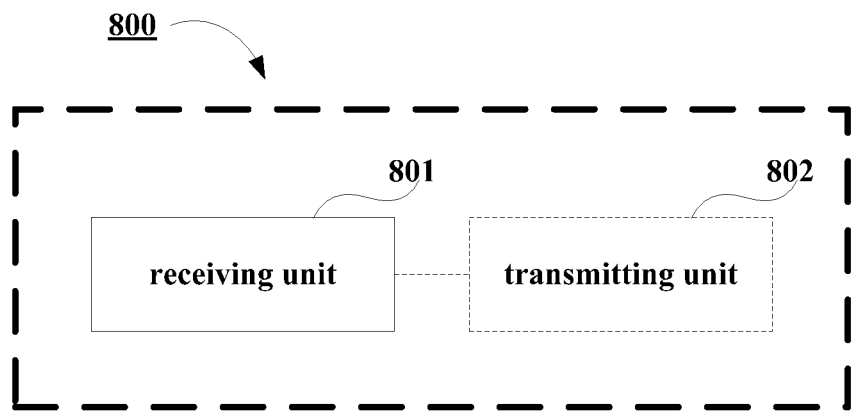
FIG. 8 shows a block diagram of an apparatus 800 for receiving a scheduling request in accordance with an embodiment of the present disclosure.

FIG. 8 shows a block diagram of an apparatus 800 for receiving a scheduling request in accordance with an embodiment of the present disclosure.

As shown in FIG. 8, the apparatus 800 includes: a receiving unit 801 configured to receive a scheduling request from a terminal device via a random access procedure; the scheduling request is triggered in the terminal device when a maximum counter value of a scheduling request configuration is reached and information on the scheduling request configuration is transmitted to the network device during the random access procedure.

As shown in FIG. 8, the apparatus 800 may further include: a transmitting unit 802 configured to transmit a radio resource control reconfiguration signaling to reconfigure the scheduling request configuration; the information on the scheduling request configuration is included in the radio resource control reconfiguration signaling.

In an embodiment, the transmitting unit 802 may further configured to transmit information on releasing resources of one or more scheduling request configurations via a radio resource control signaling.

In an embodiment, a preamble of the random access procedure is received by the network device from the terminal device; one or more resources for transmitting the preamble is/are corresponding to the scheduling request configuration.

In this embodiment, the resources for transmitting the preamble may include one or more of the following: sequence resources, frequency resources and time resources.

In another embodiment, a message of the random access procedure is received by the network device from the terminal device; an identity of the terminal device and the information on the scheduling request configuration may be included in the message.

In this embodiment, the information on one or more scheduling request configurations may be included in the message when the maximum counter values of the one or more scheduling request configurations are reached.

In this embodiment, the message may be Message 3 of the random access procedure; and the information on scheduling request configuration may be included in a medium access control (MAC) control element (CE) of the Message 3.

In this embodiment, one or more of the following information may be included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

It should be appreciated that components included in the apparatus 800 correspond to the operations of the method 600. Therefore, all operations and features described above with reference to FIG. 6 are likewise applicable to the components included in the apparatus 800 and have similar effects. For the purpose of simplification, the details will be omitted.

It should be appreciated that the components included in the apparatus 800 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 800 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 800 may be a part of a device. But it is not limited thereto, for example, the apparatus 800 may be the network device 101, other parts of the network device 101, such as transmitter and receiver, are omitted in the FIG. 8.

As can be seen from the above embodiments, information on SR configuration is transmitted by a terminal device to a network device during random access procedure. Therefore, the network device can know which SR configuration that the terminal device would like to reconfigure upon reception of the RACH message; and only one or more resources corresponding to the SR configuration may be released, such that service interruption for other LCGs/LCHs may not happen.

Fifth Aspect of Embodiments

A communications system is provided, as shown in FIG. 1, the communication system 100 includes a network device 101 configured to perform a method for receiving a scheduling request according to the second aspect of embodiments and a terminal device 102 configured to perform a method for transmitting a scheduling request according to the first aspect of embodiments.

A device (such as a network device 101 or a terminal device 102) is provided in an embodiment, and the same contents as those in the first aspect and the second aspect of embodiments are omitted.

Figure 9:
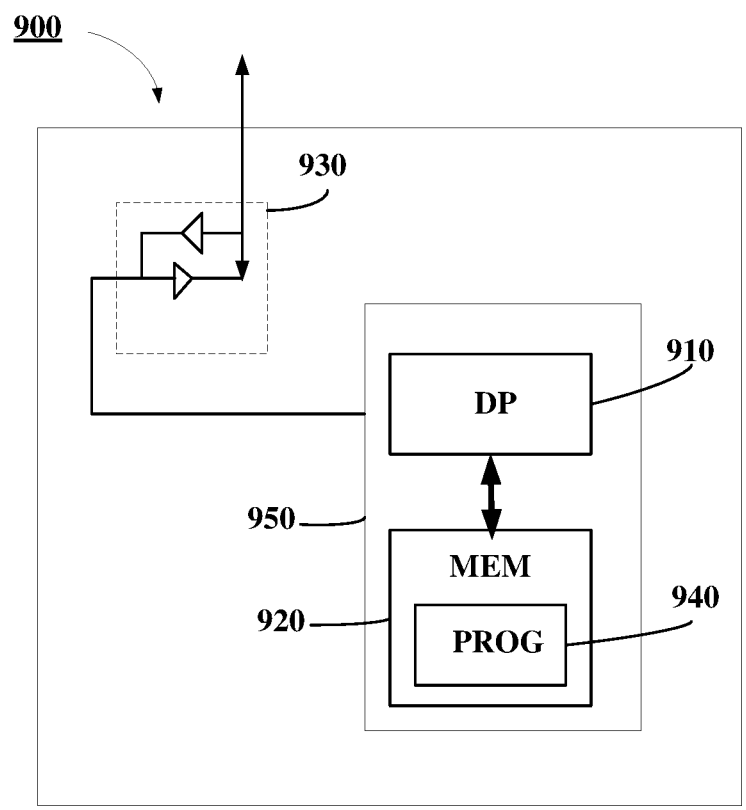
FIG. 9 is a simplified block diagram of a device that is suitable for implementing embodiments of the present disclosure.

FIG. 9 shows a simplified block diagram of a device 900 that is suitable for implementing embodiments of the present disclosure. It would be appreciated that the device 900 may be implemented as at least a part of, for example, the network device 101 or the terminal device 102.

As shown, the device 900 includes a communicating means 930 and a processing means 950. The processing means 950 includes a data processor (DP) 910, a memory (MEM) 920 coupled to the DP 910. The communicating means 930 is coupled to the DP 910 in the processing means 950. The MEM 920 stores a program (PROG) 940. The communicating means 930 is for communications with other devices, which may be implemented as a transceiver for transmitting/receiving signals.

In some embodiments where the device 900 acts as a terminal device. For example, the memory 920 stores a plurality of instructions; and the processor 910 coupled to the memory 920 and configured to execute the instructions to: transmit a scheduling request to a network device via a random access procedure when a maximum counter value of a scheduling request configuration is reached. Information on the scheduling request configuration is transmitted to the network device during the random access procedure.

In an embodiment, a preamble of the random access procedure is transmitted to the network device; one or more resources for transmitting the preamble is/are corresponding to the scheduling request configuration.

In an embodiment, the resources for transmitting the preamble may include one or more of the following: sequence resources, frequency resources and time resources.

In an embodiment, a message of the random access procedure is transmitted to the network device; an identity of the terminal device and the information on the scheduling request configuration are included in the message.

In an embodiment, the information on one or more scheduling request configurations are included in the message when the maximum counter values of the one or more scheduling request configurations are reached.

In an embodiment, the message is Message 3 of the random access procedure; and the information on scheduling request configuration is included in a medium access control (MAC) control element (CE) of the Message 3.

In an embodiment, one or more of the following information may be included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

In an embodiment, the processor 910 is further configured to execute the instructions to: receive a radio resource control reconfiguration signaling to reconfigure the scheduling request configuration; the information on the scheduling request configuration is included in the radio resource control reconfiguration signaling.

In an embodiment, the processor 910 is further configured to execute the instructions to: release resources of all scheduling request configurations when a maximum counter value of a scheduling request configuration is reached; or release resources of a scheduling request configuration when a maximum counter value of the corresponding scheduling request configuration is reached; or release resources of a group of scheduling request configurations when a maximum counter value of the scheduling request configuration is reached.

In an embodiment, information on releasing resources of one or more scheduling request configurations is predefined, or is preconfigured by a radio resource control signaling.

In an embodiment, the processor 910 is further configured to execute the instructions to: receive information on releasing resources of one or more scheduling request configurations via a radio resource control signaling.

In some other embodiments where the device 900 acts as a network device. For example, the memory 920 stores a plurality of instructions; and the processor 910 coupled to the memory 920 and configured to execute the instructions to: receive a scheduling request from a terminal device via a physical random access channel. The scheduling request is triggered in the terminal device when a maximum counter value of a scheduling request configuration is reached and information on the scheduling request configuration is transmitted to the network device during the random access procedure.

In an embodiment, a preamble of the random access procedure is received from the terminal device; one or more resources for transmitting the preamble is/are corresponding to the scheduling request configuration.

In an embodiment, the resources for transmitting the preamble may include one or more of the following: sequence resources, frequency resources and time resources.

In an embodiment, a message of the random access procedure is received from the terminal device; an identity of the terminal device and the information on the scheduling request configuration are included in the message.

In an embodiment, the information on one or more scheduling request configurations may be included in the message when the maximum counter values of the one or more scheduling request configurations are reached.

In an embodiment, the message is Message 3 of the random access procedure; and the information on scheduling request configuration is included in a medium access control (MAC) control element (CE) of the Message 3.

In an embodiment, one or more of the following information may be included in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

In an embodiment, the processor 910 is further configured to execute the instructions to: transmit a radio resource control reconfiguration signaling to reconfigure the scheduling request configuration; the information on the scheduling request configuration is included in the radio resource control reconfiguration signaling.

In an embodiment, the processor 910 is further configured to execute the instructions to: transmit information on releasing resources of one or more scheduling request configurations via a radio resource control signaling.

The PROG 940 is assumed to include program instructions that, when executed by the associated DP 910, enable the device 900 to operate in accordance with the embodiments of the present disclosure, as discussed herein with the method 300 or 600. The embodiments herein may be implemented by computer software executable by the DP 910 of the device 900, or by hardware, or by a combination of software and hardware. A combination of the data processor 910 and MEM 920 may form processing means 950 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a terminal device, comprising:
transmitting a scheduling request to a network device via a random access procedure when a maximum counter value of a scheduling request configuration is reached, the maximum counter value being a maximum number of times the terminal device has transmitted a scheduling request without receiving resource assignments from the network device and information on the scheduling request configuration conveyed to the network device during the random access procedure, the information on the scheduling request configuration transmitted to the network device in a message of the random access procedure, the message comprising an identity of the terminal device and the information on one or more scheduling request configurations when the maximum counter value of the one or more scheduling request configurations is reached; and releasing resources of at least one scheduling request configuration when the maximum counter value of the at least one scheduling request configuration is reached, the resources of the at least one scheduling request configuration being released based on at least one of a priority level and quality of the at least one scheduling request configuration.

2. The method according to claim 1, wherein a preamble of the random access procedure is transmitted to the network device and a resource for transmitting the preamble corresponds to the scheduling request configuration.

3. The method according to claim 2, wherein the resources for transmitting the preamble comprise one or more of the following: sequence resources, frequency resources and time resources.

4. The method according to claim 1, wherein the message is Message 3 of the random access procedure; and the information on scheduling request configuration is: i) comprised in a medium access control (MAC) control element (CE) of the Message 3 or ii) comprised in an RRC message which is included in the Message 3.

5. The method according to claim 1, wherein one or more of the following information are comprised in the message: index of the scheduling request configuration; a bitmap of one or more indices of scheduling request configurations; identifier of a logical channel corresponding to the scheduling request configuration; a bitmap of one or more identifiers of logical channels corresponding to scheduling request configurations; identifier of a logical channel group corresponding to the scheduling request configuration; a bitmap of one or more identifiers of logical channel groups corresponding to scheduling request configurations.

6. The method according to claim 1, the method further comprising:
receiving a radio resource control reconfiguration signaling to reconfigure the scheduling request configuration; the information on the scheduling request configuration is comprised in the radio resource control reconfiguration signaling.

7. The method according to claim 1, the method further comprising:
releasing resources of all scheduling request configurations when a maximum counter value of a scheduling request configuration is reached; or releasing resources of a scheduling request configuration when a maximum counter value of the corresponding scheduling request configuration is reached.

8. The method according to claim 7, wherein information on releasing resources of one or more scheduling request configurations and/or whether or not a random access procedure should be triggered to carry the scheduling request subsequently for one or more scheduling request configurations is predefined or preconfigured by a radio resource control signaling.

9. The method according to claim 7, the method further comprising:
receiving information on releasing resources of one or more scheduling request configurations and/or whether or not a random access procedure should be triggered to carry the scheduling request subsequently for one or more scheduling request configurations via a radio resource control signaling.

10. The method of claim 1, further comprising:
selecting a resource based on the scheduling request configuration; and using the selected resource to transmit a random access preamble to the network device via a random access channel, wherein the resource used to transmit the preamble conveys to the network device information that enables the network device to identify the scheduling request configuration.

11. The method of claim 10, wherein the scheduling request configuration is mapped to the resource, and the step of selecting a resource based on the scheduling request configuration comprises determining the resource to which the scheduling request configuration is mapped and selecting the determined resource.

12. The method of claim 1, further comprising:
initiating the random access procedure by transmitting a random access preamble to the network device via a random access channel; and after transmitting the random access preamble to the network device, receiving from the network device a random access response, wherein the step of transmitting the scheduling request is performed after receiving the random access response and comprises transmitting to the network device a message comprising information for enabling the network device to identify the scheduling request configuration.

13. The method of claim 1, the step of transmitting the scheduling request comprises transmitting to the network device a message comprising: a temporary identifier for identifying the terminal device and information for enabling the network device to identify the scheduling request configuration.

14. A method in a network device, comprising:
receiving a scheduling request from a terminal device via a random access procedure, the scheduling request being triggered in the terminal device when a maximum counter value of a scheduling request configuration is reached and information on the scheduling request configuration conveyed to the network device during the random access procedure, the maximum counter value being a maximum number of times the terminal device has transmitted a scheduling request without receiving resource assignments from the network device, the information on the scheduling request configuration received by the network device in a message of the random access procedure, the message comprising an identity of the terminal device and the information on one or more scheduling request configurations when the maximum counter value of the one or more scheduling request configurations is reached; and
triggering a release of resources of at least one scheduling request configuration in the terminal device when the maximum counter value of the at least one scheduling request configuration is reached, the resources of the at least one scheduling request configuration being released based on at least one of a priority level and quality of the at least one scheduling request configuration.

15. The method according to claim 14, wherein a preamble of the random access procedure is received from the terminal device; one or more resources for transmitting the preamble is/are corresponding to the scheduling request configuration.

16. The method according to claim 15, wherein the resources for transmitting the preamble comprising one or more of the following: sequence resources, frequency resources and time resources.

17. The method according to claim 14, wherein the message is Message 3 of the random access procedure; and the information on scheduling request configuration is: i)

comprised in a medium access control (MAC) control element (CE) of the Message 3 or ii) comprised in a RRC message which is included in the Message 3.

18. The method according to claim 14, the method further comprising:
   transmitting a radio resource control reconfiguration signaling to reconfigure the scheduling request configuration; the information on the scheduling request configuration is comprised in the radio resource control reconfiguration signaling.

19. The method according to claim 14, the method further comprising:
   transmitting information on releasing resources of one or more scheduling request configurations and/or whether or not a random access procedure should be triggered to carry the scheduling request subsequently for one or more scheduling request configurations via a radio resource control signaling.

20. A terminal device, comprising:
   a processor; and a memory, the memory containing instructions executable by the processor whereby the terminal device is operative to:
      transmit a scheduling request to a network device via a random access procedure when a maximum counter value of a scheduling request configuration is reached, the maximum counter value being a maximum number of times the terminal device has transmitted a scheduling request without receiving resource assignments from the network device and information on the scheduling request configuration conveyed to the network device during the random access procedure, the information on the scheduling request configuration transmitted to the network device in a message of the random access procedure, the message comprising an identity of the terminal device and the information on one or more scheduling request configurations when the maximum counter value of the one or more scheduling request configurations is reached; and
      release resources of at least one scheduling request configuration when the maximum counter value of the at least one scheduling request configuration is reached, the resources of the at least one scheduling request configuration being released based on at least one of a priority level and quality of the at least one scheduling request configuration.

* * * * *